United States Patent [19]

Upton

[11] 4,212,352
[45] Jul. 15, 1980

[54] GRIPPING MEMBER FOR WELL TOOLS
[75] Inventor: Thomas E. Upton, Garland, Tex.
[73] Assignee: Dresser Industries, Inc., Dallas, Tex.
[21] Appl. No.: 1,499
[22] Filed: Jan. 8, 1979
[51] Int. Cl.² .............................................. E21B 23/00
[52] U.S. Cl. .................................... 166/206; 166/217
[58] Field of Search ............... 166/131, 138, 206, 212, 166/216, 217; 175/99, 230; 24/DIG. 22

[56] References Cited
U.S. PATENT DOCUMENTS

| | | | |
|---|---|---|---|
| 3,308,886 | 3/1967 | Evans | 166/138 X |
| 3,548,936 | 12/1970 | Kilgore | 166/216 |
| 3,739,849 | 6/1973 | Meripol | 166/216 |
| 3,799,277 | 3/1974 | Kellner | 175/99 X |
| 4,029,147 | 6/1977 | Jett | 166/217 |

*Primary Examiner*—James A. Leppink
*Attorney, Agent, or Firm*—Richard M. Byron

[57] ABSTRACT

A unitary tubular cylindrical gripping member for well tools has variable angled gripping surfaces formed thereon by a plurality of insert teeth elements arranged to provide constant positive gripability of the gripping member in well casings.

7 Claims, 3 Drawing Figures

GRIPPING MEMBER FOR WELL TOOLS

TECHNICAL FIELD

This invention is related to unitary tubular gripping members for pivotal mounting on well tools to secure the well tool in place in the well casing.

BACKGROUND OF THE INVENTION

A well packer utilizing a tubular gripping member was first disclosed in U.S. Pat. No. 3,548,936 to Kilgore et al. The well packer gripping slip disclosed therein utilized a generally flat tooth profile along a substantially cylindrical surface.

One improvement in this gripping member involved providing versatility by varying the tooth crest diameter over several rows of teeth so the gripping member could be utilized in casing sizes of varying internal dimensions with improved gripability of the well packer gripping member therein.

Another improvement in the gripping member is directed to having a curved bounding tooth profile with varying angles of tooth faces according to the location of the tooth along the curved tooth profile to provide constant gripability in well casings.

SUMMARY OF THE INVENTION

This unitary gripping member has gripping surfaces formed by a plurality of insert teeth elements arranged in groupings to provide constant and positive gripability of the gripping member in the well casing. The insert teeth elements are placed in groupings such that outer or crest edge surfaces thereof outline a curved profile which uniformly engages the well casing upon rotation of the gripping member for setting the well tool with a minimum of slippage in the well casing. An object of this invention is to provide a unitary gripping member with a plurality of insert teeth elements which form the profile of gripping surfaces on the gripping member and which will easily, quickly and with a positive action dig into or grippingly engage the interior surface of a well casing for securing a well tool.

Another object of this invention is to provide a unitary gripping member or slip for a well tool having the gripping surface formed by by a plurality of individually inserted tooth elements that define a crest line by forming the profile of gripping surfaces and wherein these tooth elements are significantly harder than a typical well casing in which the tool is installed thus enhancing the gripping ability of the slip and permitting it to grip the casing easily and quickly without being damaged by longitudinal sliding movement in the casing.

Various other objects, advantages and features of this invention will become apparent to those skilled in the art from the following discussion taken in conjunction with the accompanying drawings.

DETAILED DESCRIPTION

Figure 1:
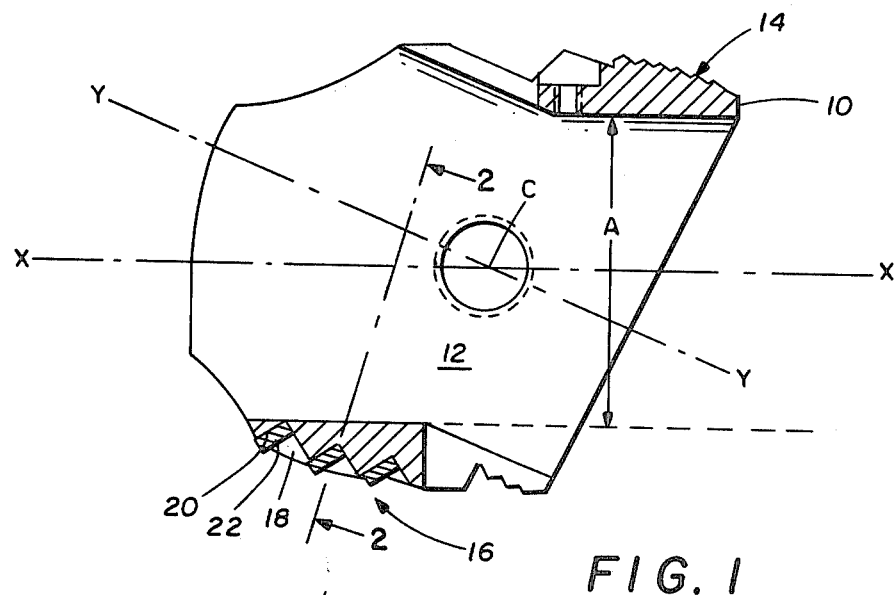
FIG. 1 is a cross-sectional side view of a tubular gripping member having the present invention.

FIG. 1 is a full side cross-sectional view of a unitary anchor or tubular gripping member 10 (commonly referred to as a slip) having a generally cylindrical body with dual axis bore passage 12 longitudinally therethrough. Bore passage 12 comprises two intersecting cylindrical bores having axes X—X and Y—Y intersecting at point C. Point C is the axis of pivotal support for tubular gripping member 10. A series of parallel peripheral ridges 14 are formed along what normally is the lower end of one side of tubular gripping member 10 when installed. Ridges 14 define teeth on the load end of tubular gripping member 10. A diametrically opposed set of teeth, indicated generally at 16, are formed in what is normally the upper opposite side of the tubular gripping member. Teeth 16 are on the passive end of tubular gripping member 10.

Tubular gripping member 10 is adapted to be placed over a tubular mandrel having a general external diameter slightly smaller than the bore of bore passage X—X as shown by dimension A. Tubular gripping member 10 is adapted to partially rotate about point C on the tubular mandrel passing therethrough. The rotation of body member 10 serves to move both of the toothed sections 14 and 16 into and out of contact with the inner wall of a well casing. This rotation occurs when the well packer or other well tool upon which tubular gripping member 10 is set or is released.

When tubular gripping member 10 is oriented such that the bore passage corresponding to axis X—X is parallel to the packer mandrel, then the sets of teeth 14 and 16 will be in the non-contacting position in the casing. When tubular gripping member 10 has rotated toward a position where axis Y—Y approaches or is parallel to the packer mandrel, then teeth sets 14 and 16 will be moved outward into biting engagement in the casing interior.

Figure 2:
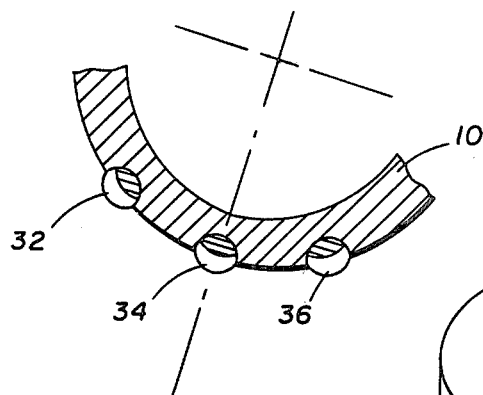
FIG. 2 is a cross-section of the insert toothed portion of the gripping member of FIG. 1 taken on line 2—2 of FIG. 1.

Referring to FIGS. 1 and 2 together, such illustrates placement of some of the insert teeth in tubular gripping member 10. All of the individual insert teeth elements are secured in a similar manner. A recess including a curved side wall 18 having a substantially flat bottom portion 20 transverse to side wall 18 is formed in the external peripheral portion of the tubular gripping member side wall 18 has a substantially constant diameter curvature defined about a longitudinal axis which is angularly oriented relative to bore passage axis X—X. An insert tooth member 22 is positioned within the recess adjacent to bottom 20 and side wall 18 and secured in the position shown. Insert tooth 22 is a cylindrical member with the ends transverse to the cylindrical axis thereof. The diameter of insert tooth 22 is selected slightly smaller than the diameter of cylindrical side wall 18 so the tooth will fit snugly within the recess and a cutting tip portion thereof will extend from the recess and beyond the outer surface boundary of tubular gripping member 10 thereby forming a gripping surface of the tubular gripping member. Insert tooth 22 can be constructed of very hard metallic material such as an alloy containing a significant portion of carbide or other metallic alloys which are specially blended to be very hard as well as wear and abrasion resistent. One suitable tooth material is an alloy of tungsten carbide. The insert teeth can be secured in place in the respective recesses of tubular gripping member 10 by utilizing bonding techniques, welding or soldering. Where tungsten carbide insert tooth members have been used, they have successfully been retained in the recesses of tubular gripping member 10 by using a category of silver brazing alloys commonly referred to as "silver solder".

Figure 3:
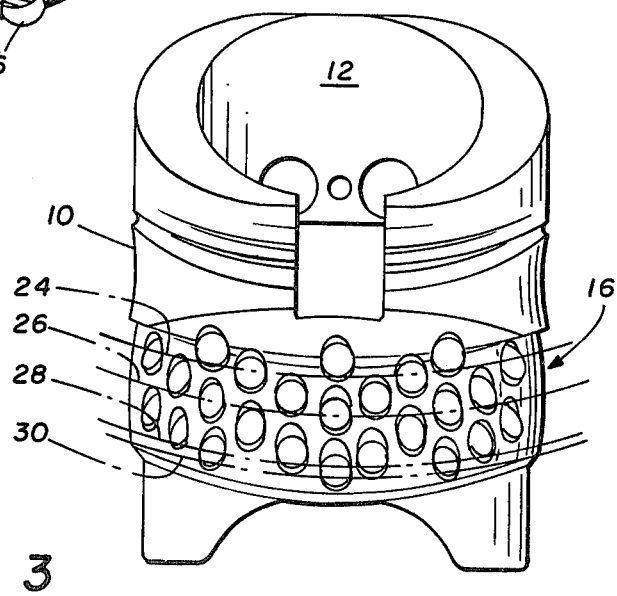
FIG. 3 is a perspective view of the tubular gripping member taken from the side having the plurality of insert teeth elements.

Referring to FIGS. 2 and 3, which cooperatively show the general arrangement, the insert teeth elements in their relative location on the exterior of tubular gripping member 10. The plurality insert teeth are positioned so that the crests thereof define a crest line curing around the exterior of tubular gripping member 10. In FIG. 3, these crest lines indicated by fine dashed lines drawn through the crest of the teeth and indicated at 24, 26, 28 and 30 in the several rows of teeth depicted. FIG. 2 is a view taken through teeth 32, 34 and 36 which clearly shows the spaced relation of the teeth. The crest lines of the teeth are curved and the curvatures lie in different radii of curvature as measured from and along axis X—X. This difference of radii for the teeth crest lines results in a curved bounding profile in the plane containing the teeth crests. This allows in different rows of teeth to contact the well casing depending upon the internal diameter of the well casing. Tubular gripping member 10 is rotated by an annular member of the well tool contacting end surface 32 and moving toward point C. This action moves end surface 32 into a generally perpendicular relation toward a well tool mandrel extending though the gripping member and simultaneously brings the toothed segments 14 and 16 into engagement with the wellbore casing interior.

Due to the fact that tubular gripping member 10 rotates to achieve engagement, a different amount of rotation about the pivot axis, indicated at C, is needed for each different internal diameter casing size. Because of this, the lower tooth crest line 24 will contact the interior surface of a smaller diameter casing upon a relatively small rotation of tubular gripping member 10 about rotating point C. However, when the tubular gripping member is positioned within a larger diameter casing, a greater rotation of tubular gripping member 10 will be necessary for the other increasingly larger diameter tooth crest lines 26, 28 and 30 to contact the casing interior of the larger diameter casing. Because of the different diameters of the tooth crest radii as exhibited by lines 24–30 of each succeedingly larger diameter crest will engage the interior of the well casing in relation to the amount of tubular gripping member rotation around point C.

Referring to FIG. 3, the spacing of the plurality of individual insert teeth elements is done in order to provide a sufficient quantity of the teeth elements in each of the rows for effectively and positively gripping the casing when the well tool is set. Positioning of the insert teeth elements in a spaced relation in each of the rows and off-setting the teeth elements from row to row around the periphery of the tubular gripping member allows for maintaining a generally uniform spaced relation between the insert teeth elements and correctly positioning the crest lines of each row of teeth in an uniform spaced relation to each other. The thickness of the insert teeth elements is such that a sufficient portion of each tooth element extends from tubular gripping member 10 to substantially engage the well casing. Because the gripping surfaces of the tubular gripping member 10 must engage the well casing sufficiently to retain the well tool in place against first forces exerted on it during well servicing and pumping processes and the like, there must be sufficient area of each gripping surface engaged in the well casing to prevent any inadvertent sliding movement of the tubular gripping member within the well casing after it is positioned to secure the well tool. The number of teeth in the exposed combined area of the several rows of teeth which is exposed must necessarily be selected to provide a sufficiently available gripping area or contact surface for engaging or digging into the well casing for retaining the tubular gripping member and the associated well tool in place.

By utilizing insert teeth elements constructed of a material which is substantially harder than the typical well casing, this permits the teeth elements to easily dig into or grippingly engage the well casing when tubular gripping member 10 is rotated for setting the well tool. Because of the relatively harder individual teeth elements, they have a tendency to readily grippingly engage the well casing in a positive manner once they are brought into contact with the well casing surface. This is particularly important when the tubular gripping member is utilized on a hydraulically set packer. In this instance, the packer is set by having a substantially large fluid force applied to the setting mechanism of the packer. When this force is applied, it sets the packer and has a tendency to displace the packer downwardly within the casing or wellbore. Because of the novel individual insert teeth elements of this tubular gripping member, they dig in or grippingly engage the well casing upon contact and thereby prevent motion of the well packer within the casing. In the event that a very large fluid force is applied to the packer which is substantially above that required for setting of the hydraulically actuated packer, then some sliding motion of the packer sealing elements and the tubular gripping member may occur within the well casing. In this circumstance, the very hard nature of the individual teeth elements will insure that they are not damaged as the tubular gripping member slides through the casing in the rotated position with the teeth sliding on the interior surface of the casing. Once the teeth have slid in the interior of the casing, they will dig into or grippingly engage the casing when the forces causing the sliding motion decrease or the sliding motion ceases. It is to be noted that when utilizing the above described carbide material for the insert teeth elements, sliding motion in the casing does not appreciably deteriorate the crest portion of the teeth sufficiently to significantly affect performance of the tubular gripping member. It can be seen from the above that a tubular gripping member is provided which will consistently and positively grip the well casing under normal as well as adverse circumstances. The usage of a plurality of insert teeth elements on a face of the tubular gripping member which contacts the well casing provides a structure for presenting a very hard tooth surface on the gripping surface of the tubular gripping member. The positioning of the plurality of teeth elements is such that the tubular gripping member will operate effectively and consistently within a range of casing bore diameters.

One preferred embodiment of the present invention has been described herein in order to provide an understanding of the general principles of the invention. It is to be understood that various changes and refinements to the invention can be affected in the described gripping member for well tools without departing from the scope of the invention and these general principles. All modifications and changes of this nature are deemed to be within the spirit and scope of the invention except as limited by the appended claims or reasonable equivalence thereof.

The embodiments of the invention in which an exclusive property or privilege is claimed are defined as follows:

1. A unitary tubular gripping member having a two segment intersecting-axis bore passage therethrough and exterior gripping means thereon, said gripping means further comprising a plurality of insert teeth elements located such that crests of said tooth elements define a plurality of crest lines curved around said tubular gripping member and wherein said individually curved crests with a radius of curvature substantially smaller than the radius of curvature of said crest lines and arranged with a portion of each curved crests thereof lying substantially in a crest line having a curved profile around the tubular gripping member, said insert teeth elements are located in a staggered relation wherein crests of adjacent tooth elements define points substantially along adjacent crest lines, and said insert teeth elements are mounted in individual recesses in said tubular gripping member and located in a spaced relation to each other.

2. The tubular gripping member of claim 1 wherein said tubular gripping member has two sets of teeth located at opposite sides and near opposite ends thereof with one of said sets of teeth comprised of said insert teeth elements with the crests thereof lying in a partially circumferentially disposed outline around a portion of said member.

3. The tubular gripping member of claim 1, wherein each of said insert teeth elements individually comprise a unitary tooth member having a generally cylindrical shape including a cylindrical exterior side and circular top and bottom sides and mounted in a correspondingly shaped recess in said tubular gripping member such that a portion of said tooth extends from said tubular gripping member wherein such portion includes a portion of a top side and a portion of the adjoining cylindrically shaped exterior sides.

4. The tubular gripping member of claim 3, wherein said individual insert teeth elements are constructed of a material which is substantially harder than said gripping member and a wellbore casing in which said gripping member is used.

5. A well tool gripping member, comprising:
   (a) a tubular generally cylindrical body member having a dual intersecting-axis bore passage therethrough; and
   (b) tooth means on said body member on a portion of at least one side at one end thereof, said tooth means having a plurality of rows of individual insert teeth elements located such that crest portions of said teeth elements define crest lines of the individual rows said teeth elements being spaced from others in the same row and having individually curved crests with a radius of curvature substantially smaller than the radius of curvature of said crest lines and with a portion of the crest of these teeth elements each in a row lying substantially along a curved line, and each of said rows having the crest line of said teeth thereof located at different distances from each other with respect to said intersecting-axis bore passage.

6. A unitary tubular gripping member with an intersecting-axis bore passage longitudinally therethrough for use on a well tool having a mandrel and supporting the gripping member longitudinally through said bore passage and transversely rotatably displacing the gripping member for securing the well tool in a wellbore, wherein:
   (a) said gripping member has a plurality of gripping teeth on opposed end portions thereof adapted to be moved into gripping position with a wellbore upon rotational movement of said member;
   (b) said plurality of teeth includes separate sets of teeth on each end portion of said gripping member wherein both sets of said teeth have a curved profile and both sets of teeth are arranged to engage a wellbore inner wall of varying interdiameter; and
   (c) one of said sets of teeth is comprised of a plurality of individual tooth elements located such that crests of said tooth elements define a plurality of crest lines curved around said tubular gripping member and wherein said tooth elements have individually curved crests with a radius of curvature substantially smaller than the radius of curvature of said crest lines and said tooth elements are mounted in recesses in said gripping member with a cutting edge portion extending from the associated recess for engaging a wellbore around the well tool and said individual tooth elements being arranged in a staggered relation wherein crests of adjacent tooth elements define points substantially along adjacent crest lines.

7. The unitary tubular gripping member of claim 6, wherein said individual tooth elements are arranged in a plurality of rows wherein alternating tooth elements in each row define points substantially along adjacent crest lines that curves around said gripping member in transverse relation to said bore passage and with said crest lines being at different distances from a center of rotation of said tubular gripping member.

* * * * *